United States Patent
Dunn et al.

(10) Patent No.: US 8,587,727 B2
(45) Date of Patent: *Nov. 19, 2013

(54) METHOD OF AND APPARATUS FOR UTILIZING VIDEO BUFFER IN A MULTI-PURPOSE FASHION TO EXTEND THE VIDEO BUFFER TO MULTIPLE WINDOWS

(75) Inventors: Ted Dunn, Los Gatos, CA (US); James Amendolagine, San Jose, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 37 days.

This patent is subject to a terminal disclaimer.

(21) Appl. No.: 13/311,507

(22) Filed: Dec. 5, 2011

(65) Prior Publication Data

US 2012/0075533 A1     Mar. 29, 2012

Related U.S. Application Data

(60) Continuation of application No. 12/974,174, filed on Dec. 21, 2010, now Pat. No. 8,120,709, which is a continuation of application No. 12/832,639, filed on Jul. 8, 2010, now Pat. No. 8,004,611, which is a division of application No. 12/544,669, filed on Aug. 20, 2009, now Pat. No. 7,777,814, which is a continuation of application No. 10/402,044, filed on Mar. 27, 2003, now Pat. No. 7,656,461.

(51) Int. Cl.
    *H04N 5/445* (2011.01)

(52) U.S. Cl.
    USPC ............................................. 348/588

(58) Field of Classification Search
    USPC ............... 348/714–718, 588, 584, 563–569
    See application file for complete search history.

(56) References Cited

U.S. PATENT DOCUMENTS

| | | | |
|---|---|---|---|
| 5,686,960 A * | 11/1997 | Sussman et al. | 348/218.1 |
| 5,854,628 A * | 12/1998 | Nakagawa | 715/803 |
| 6,373,526 B1 * | 4/2002 | Kessler et al. | 348/468 |
| 6,442,206 B1 * | 8/2002 | Hrusecky | 375/240.21 |
| 6,470,051 B1 * | 10/2002 | Campisano et al. | 375/240.21 |
| 6,996,174 B2 * | 2/2006 | Campisano et al. | 375/240.13 |
| 7,656,461 B2 * | 2/2010 | Dunn et al. | 348/715 |
| 7,777,814 B2 * | 8/2010 | Dunn et al. | 348/588 |
| 8,004,611 B2 * | 8/2011 | Dunn et al. | 348/588 |
| 8,120,709 B2 * | 2/2012 | Dunn et al. | 348/588 |

* cited by examiner

*Primary Examiner* — Paulos M Natnael
(74) *Attorney, Agent, or Firm* — Haverstock & Owens LLP

(57) ABSTRACT

The present invention includes a method and device that allows efficient mixing of multiple video images with a graphics screen while utilizing only one video buffer. The present invention partitions the sole video buffer, pre-scales the plurality of video images and inserts them into the partitioned video buffer in a predetermined range of buffer addresses. The present invention mixes the partitioned video including the pre-scaled video images with the graphics screen to produce a video display including both a video screen and a graphics screen.

17 Claims, 4 Drawing Sheets

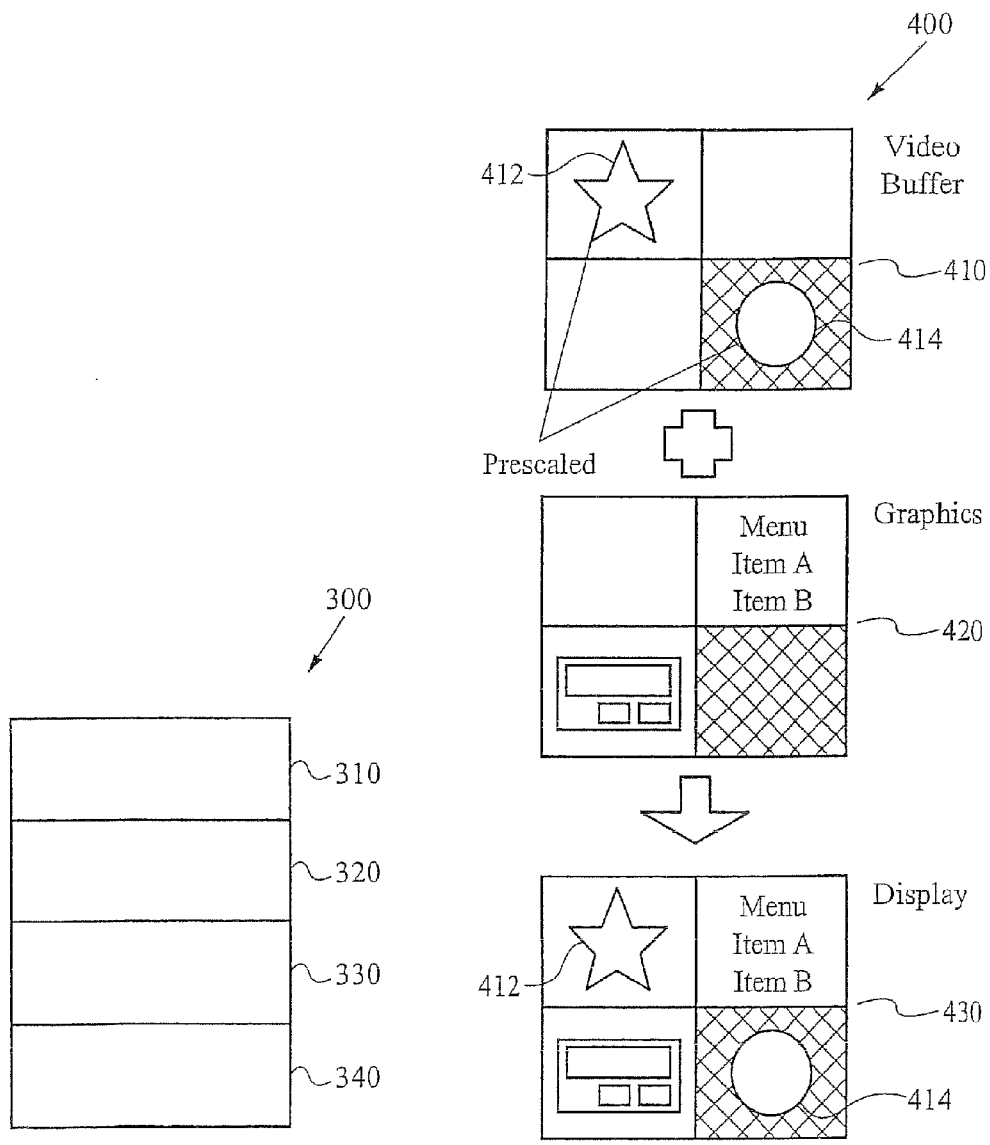

METHOD OF AND APPARATUS FOR UTILIZING VIDEO BUFFER IN A MULTI-PURPOSE FASHION TO EXTEND THE VIDEO BUFFER TO MULTIPLE WINDOWS

This patent application is a continuation of co-pending U.S. patent application Ser. No. 12/974,174, filed on Dec. 21, 2010, titled "METHOD OF AND APPARATUS FOR UTILIZING VIDEO BUFFER IN A MULTI-PURPOSE FASHION TO EXTEND THE VIDEO BUFFER TO MULTIPLE WINDOWS", which is a continuation of U.S. patent application Ser. No. 12/832,639, filed on Jul. 8, 2010, titled "METHOD OF AND APPARATUS FOR UTILIZING VIDEO BUFFER IN A MULTI-PURPOSE FASHION TO EXTEND THE VIDEO BUFFER TO MULTIPLE WINDOWS", which is a divisional of U.S. patent application Ser. No. 12/544,669, filed on Aug. 20, 2009 (now U.S. Pat. No. 7,777,814, issued on Aug. 17, 2010), titled "METHOD OF AND APPARATUS FOR UTILIZING VIDEO BUFFER IN A MULTI-PURPOSE FASHION TO EXTEND THE VIDEO BUFFER TO MULTIPLE WINDOWS," which is a continuation of U.S. patent application Ser. No. 10/402,044, filed on Mar. 27, 2003 (now U.S. Pat. No. 7,656,461, issued on Feb. 2, 2010), titled "METHOD OF AND APPARATUS FOR UTILIZING VIDEO BUFFER IN A MULTI-PURPOSE FASHION TO EXTEND THE VIDEO BUFFER TO MULTIPLE WINDOWS," which are all hereby incorporated by reference in their entireties.

FIELD OF THE INVENTION

The present invention relates to the field of video and graphics displays. More particularly, the present invention relates to the field of efficient simultaneous display of video and graphics.

BACKGROUND OF THE INVENTION

In applications involving video displays, there is oftentimes a need for the display to include both a video screen as well as a graphics screen. These two elements may be mixed on a display if the hardware utilized is capable of performing such an operation. A common problem arises, as using multiple video buffers for each video image tends to consume large amounts of memory as well as bandwidth. Additional problems arise in the case where a hardware system only has the capacity to utilize one video buffer.

FIG. 1 depicts a conventional process 100 in a system where two video buffers 110, 120 are utilized to mix multiple video images 112, 114 with a graphics frame 130 to produce a display frame 140 simultaneously containing both the video images 112, 114 and the graphics frame 130. In this conventional process 100, a first image 112 is loaded into a first video buffer 110 and a second video image 114 is loaded into a second video buffer 120. The video buffers 110 and 120 are sized as if the first image 112 and the second image 114 were to be full-size images and each displayed in the full display window. The two video buffers 110, 120 are then mixed with the graphics frame 130 and the video images 112, 114 are scaled to produce the display frame 140 as shown with both video images 112, 114. As stated previously, this process takes up a considerable amount of memory and bandwidth as multiple full-size buffers are needed when multiple video images are present.

SUMMARY OF THE INVENTION

The present invention includes a method and device that allows efficient mixing of multiple video images with a graphics screen while utilizing only one video buffer. The present invention partitions the sole video buffer, pre-scales the plurality of video images and inserts them into the partitioned video buffer in a predetermined range of buffer addresses. The present invention mixes the partitioned video including the pre-scaled video images with the graphics screen to produce a video display including both a video screen and a graphics screen.

In one aspect of the present invention, a method produces a display frame. The display method comprises partitioning a video buffer into a plurality of sub-buffers wherein a size of each sub-buffer corresponds to a display size of a corresponding display window, scaling a first set of video data, wherein the first set of video data represents a first video image, further wherein the first set of video data is scaled to be loaded in a corresponding one of the plurality of sub-buffers, loading the first set of video data in to one of the plurality of sub-buffers of the video buffers and displaying the first set of video data in the video buffer in the display frame. When a second set of data exists the second set of video data will be scaled, further wherein the second set of video data represents a second video image. The method also includes displaying the display frame on a display device. The display device can be a television. The first and second set of video data are received from a source device by an input/output interface in a playback device. The number of the plurality of sub-buffers generated is predetermined by a user, further wherein the sub-buffers are defined by an address range. The first set of data is loaded in to a predetermined sub-buffer according to the desired location of the first video image in the display frame.

In another aspect of the present invention a playback device produces a display frame. The playback device comprises means for partitioning a video buffer into a plurality of sub-buffers wherein a size of each sub-buffer corresponds to a display size of a corresponding display window, means for scaling a first set of video data, wherein the first set of video data represents a first video image, further wherein the first set of video data is scaled to be loaded in a corresponding one of the plurality of sub-buffers, means for loading the first set of video data in to one of the plurality of sub-buffers of the video buffers and means for displaying the first set of video data in the video buffer in the display frame. When a second set of video data exists the second set of video data will be scaled, further wherein the second set of video data represents a second video image. The playback device also includes means for displaying the display frame on a display device. The display device can be a television. The first and second set of video data are received from a source device by an input/output interface in the playback device. The number of the plurality of sub-buffers generated by the means for partitioning is predetermined by a user, further wherein the sub-buffers are defined by an address range. When the means for loading loads the first set of data, the first set of data is loaded in to a predetermined sub-buffer according to the desired location of the first video image in the display frame.

In yet another aspect of the present invention, a method produces a display frame. The method comprises partitioning a video buffer into a plurality of sub-buffers wherein a size of each sub-buffer corresponds to a display size of a corresponding display window, scaling a first set of video data, wherein the first set of video data represents a first video image, further wherein the first set of video data is scaled to be loaded in a corresponding one of the plurality of sub-buffers, loading the first set of video data in to one of the plurality of sub-buffers of the video buffers and mixing a graphics frame and the video buffer for display. When the graphics frame and the video buffer are mixed, a second set of video data is scaled, further wherein the second set of video data represents a second video image. The method also includes displaying the display frame on a display device. The display device can be a television. The first and second set of video data are received from a source device by an input/output interface in a playback device. The number of the plurality of sub-buffers generated is predetermined by a user, further wherein the sub-buffers are defined by an address range. The first set of data is loaded in to a predetermined sub-buffer according to the desired location of the first video image in the display frame.

In yet another aspect of the present invention, a playback device produces a display frame. The playback device comprises a partitioning circuit configured to partition a video buffer into a plurality of sub-buffers wherein a size of each sub-buffer corresponds to a display size of a corresponding display window and a processor configured to scale a first set of video data, wherein the first set of video data represents a first video image, further wherein the first set of video data is scaled to be loaded in a corresponding one of the plurality of sub-buffers, wherein the processor is also configured to load the first set of video data in to one of the plurality of sub-buffers of the video buffers, and further wherein the processor is also configured to mix a graphics frame and the video buffer. When the means for mixing mixes the graphics from and the video buffer, the means for scaling will begin if a second set of video data exists, further wherein the second set of video data represents a second video image. The playback device also includes means for displaying the display frame on a display device. The display device can be a television. The first and second set of video data are received from a source device by an input/output interface in the playback device. The number of the plurality of sub-buffers generated by the means for partitioning is predetermined by a user, further wherein the sub-buffers are defined by an address range. When the means for loading loads the first set of data, the first set of data is loaded in to a predetermined sub-buffer according to the desired location of the first video image in the display frame.

In yet another aspect of the present invention, a device to mixes a graphics frame and a video buffer to produce a display frame. The device comprises an input/output interface to receive a stream of video data from a source device and a processing circuit coupled to the input/output interface, the processing circuit configured to receive the stream of video data, to partition the video buffer into a plurality of sub-buffers, to scale the video data, to load the stream of video data in to the plurality of sub-buffers and to mix the video buffer with the graphics frame to produce the display frame. The device also includes a display device coupled to the device through the input/output interface for displaying the display frame. The display device comprises a television. The source device comprises a home server. The device comprises a set-top box. The device resides within a home network. The video buffer is partitioned into a plurality of sub-buffers. The number of the plurality of sub-buffers created is predetermined by a user, further wherein the sub-buffers are defined by an address range. Each frame of the stream of video data is scaled before being loaded in to the video buffer. The stream of video data is loaded into a predetermined sub-buffer according to the desired location of the video image in the display frame.

In yet another aspect of the present invention, a set-top box to mixes a graphics frame and a video buffer to produce a display frame. The set-top box comprises an input/output interface to receive a stream of video data from a source device and a processing circuit coupled to the input/output interface, the processing circuit configured to receive the stream of video data, to partition the video buffer into a plurality of sub-buffers, to scale the video data, to load the stream of video data in to the plurality of sub-buffers and to mix the video buffer with the graphics frame to produce the display frame. The set-top box also includes a display device coupled to the set-top box through the input/output interface for displaying the display frame. The display device comprises a television. The source device comprises a home server. The set-top box resides within a home network. The video buffer is partitioned into a plurality of sub-buffers. The number of the plurality of sub-buffers created is predetermined by a user, further wherein the sub-buffers are defined by an address range. Each frame of the stream of video data is scaled before being loaded in to the video buffer. The stream of video data is loaded into a predetermined sub-buffer according to the desired location of the video image in the display frame.

In yet another aspect of the present invention, a network of devices mixes a graphics frame and a video buffer to produce a display frame. The network of devices comprises a source device to provide a stream of video data, a set-top box including an input/output interface to receive a stream of video data from the source device and a processing circuit coupled to the input/output interface, the processing circuit configured to receive the stream of video data, to partition the video buffer into a plurality of sub-buffers, to scale the video data, to load the stream of video data in to the plurality of sub-buffers and to mix the video buffer with the graphics frame to produce the display frame and a display device coupled to the set-top box through the input/output interface for displaying the display frame. The source device comprises a home server. The display device comprises a television. The video buffer is partitioned into a plurality of sub-buffers. The number of the plurality of sub-buffers created is predetermined by a user, further wherein the sub-buffers are defined by an address range. Each frame of the stream of video data is scaled before being loaded in to the video buffer. The stream of video data is loaded into a predetermined sub-buffer according to the desired location of the video image in the display frame.

BRIEF DESCRIPTION OF THE DRAWINGS

FIG. 3 illustrates a logical representation of a video buffer according to the present invention.

FIG. 4 illustrates a simultaneous display process according to the present invention.

DETAILED DESCRIPTION OF THE EMBODIMENTS

Embodiments of the present invention include a playback device that efficiently displays video and graphics simultaneously. In operation, the device is powered on. Preferably, the playback device utilizes a single video buffer and a single graphics screen, which are to be mixed or overlaid to create one single display including multiple video objects on the display at the same time with only one video buffer. The playback device of the present invention achieves this end by first partitioning the single video buffer into several sub-buffers having predetermined address ranges. The multiple video images are then scaled such that each image is inserted into a corresponding partition of the video buffer. When the video images are all inserted into the partitioned video buffer, then the video data within the video buffer is mixed with the graphics screen to produce the single display including both the video and graphics components. This playback device reduces memory and bandwidth consumption by utilizing a single video buffer, pre-scaling the video data representing each video window while still allowing multiple video images to be combined with a graphics screen.

Figure 2:
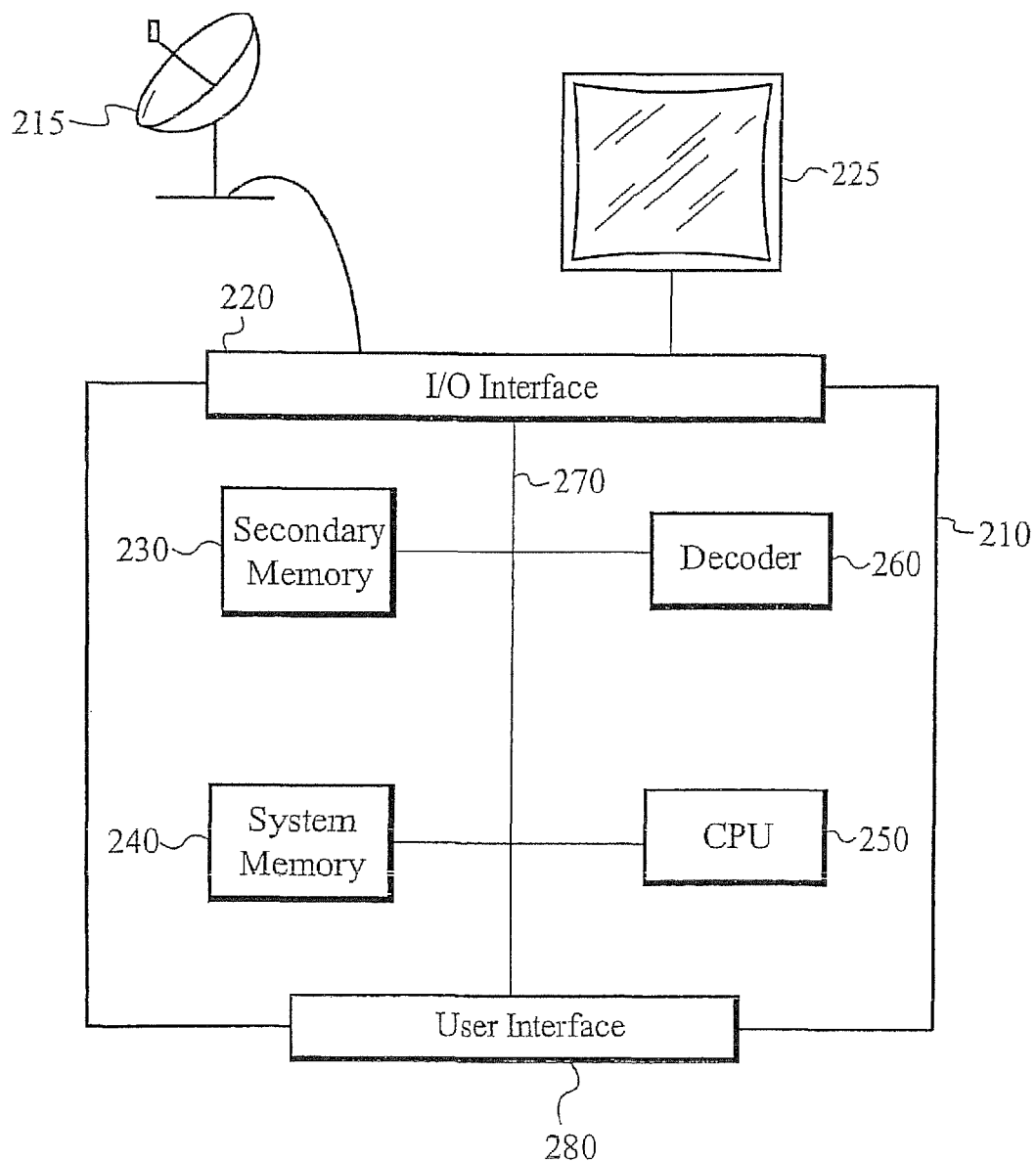
FIG. 2 illustrates a block diagram of an exemplary playback device according to the present invention.

FIG. 2 illustrates an exemplary playback device according to the present invention. In the preferred embodiment of the present invention, the playback device is a set-top box. The set-top box preferably controls the transmission of multimedia from a local storage device, such as a personal computer (PC), to a television or from a remote content provider, such as a cable television provider, to the television. The set-top box 210 includes an input/output (I/O) interface 220, a secondary memory 230, a system memory 240, a central processing unit (CPU) 250, a user interface 280, and a decoder 260 all coupled via a bi-directional bus 270. The I/O interface 220 preferably couples the set-top box 210 to a content source 215 for receiving multimedia and to the television 225 or other display device for displaying the multimedia received from the content source. In the preferred embodiment of the present invention, the mixed display is sent to the television for viewing. The I/O interface 220 can also be coupled to a conventional network, such as the Internet, to receive periodic software upgrades including new versions of operating software and new or upgraded applications. The I/O interface 220 also sends and receives control signals to and from the user interface 280 and the television. The user interface 280 preferably comprises a keypad and display, as is well known in the art. Alternatively, the user interface 280 comprises any conventional user interface.

The secondary memory 230 stores the software used to enable operation of the set-top box 210 along with a plurality of applications. Exemplary applications include, but are not limited to a menu of available content such as an on-screen television guide, and display parameter settings such as color, tint, and brightness. Preferably, the secondary memory 230 is flash memory. Alternatively, any conventional type of memory can be used. Preferably, the system memory 240 includes random access memory (RAM). The system memory 240 can also include additional buffers, registers, and cache according to specific design implementations. Multimedia received by the set-top box 210 is preferably encrypted to prevent unauthorized access and use, and the decoder 260 decrypts the multimedia according to access authorization provided by the CPU 250.

The playback device 210 connects to a home server (not shown) to access encrypted content and to a license server (not shown) to obtain access to the rights for the playback. The playback device 210 preferably only initiates connections and does not accept connections initiated from other devices. The encrypted content is decrypted by the playback device 210 in secure hardware and preferably outputs the content as analog, macrovision-protected video.

Functionality of the playback device 210 includes browsing capability, video playback, audio playback, and network configuration. The playback device 210 includes protocol stacks to allow for network connectivity with many different networking environments.

FIG. 3 depicts a logical representation of a video buffer 300 of the preferred embodiment of the present invention. In the example illustrated in FIG. 3, the video buffer 300 is partitioned into four sub-buffers 310, 320, 330, 340, each sub-buffer 310, 320, 330, 340 having an address range derived from the original whole video buffer 300. Of course, partitioning the video buffer 300 into four sub-buffers 310, 320, 330, 340 is for exemplary purposes only. It will be apparent to one skilled in the art that the video buffer 300 may be partitioned into more or less sub-buffers 310, 320, 330, 340 depending on system constraints and application requirements. In the preferred embodiment of the present invention the video buffer 300 is partitioned into a number of sub-buffers 310, 320, 300, 340 corresponding to the number of separate windows being displayed by the set top box 210 (FIG. 2) on the display device 325. Preferably, each sub-buffer 310, 320, 330, 340 is of a proportionate size within the video buffer 300 corresponding to the window in which its video data is displayed.

FIG. 4 depicts a simultaneous display process 400 according to the preferred embodiment of the present invention. In the preferred embodiment a single video buffer 410 is utilized. As described previously, the video buffer 410 is partitioned into four equal parts and the video images 412, 414 are scaled to fit into an address range designated by one of the partitions. One advantage of utilizing only one video buffer 410 is that multiple video buffers require greater memory space. By pre-scaling the video data to fit into the appropriately sized sub-buffer 310, 320, 330, 340, the amount of video data required to be stored is reduced from a conventional system, in which video data representing a full-size video buffer is stored for each video window.

Figure 1:
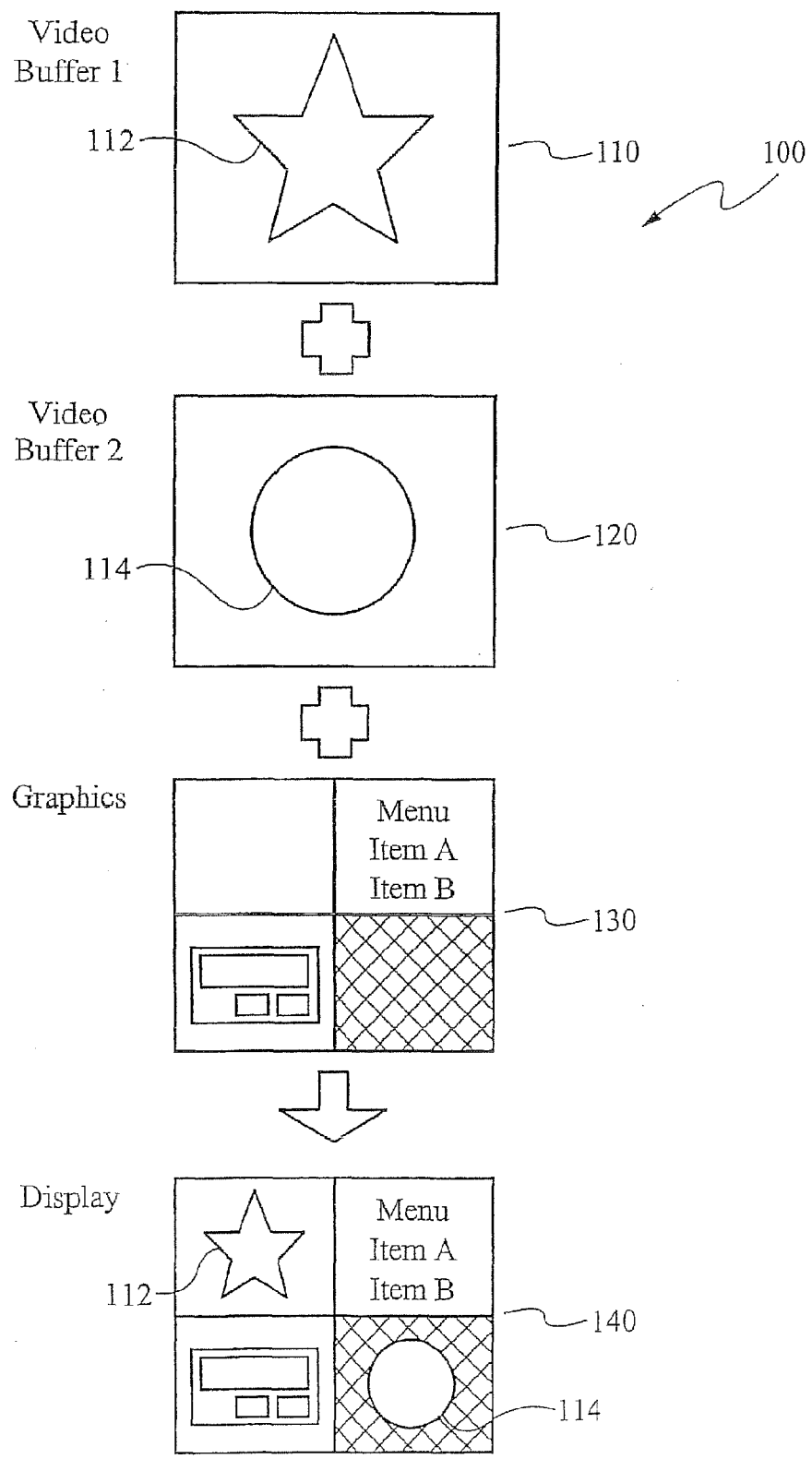
FIG. 1 illustrates a conventional simultaneous display process including multiple video windows and graphics.

Referring back to FIG. 1 for comparison, the partitioning of a single video buffer also conserves bandwidth. For the purposes of illustration, assume that each video buffer 110, 120 requires 1 Mega Byte per second (MB/s) of bandwidth in normal operation. In this case, the conventional process 100 depicted in FIG. 1 would require 2 MB/s of bandwidth, 1 MB/s for each video buffer 110, 120. Referring again to FIG. 4, a partitioned video buffer 410 of the preferred embodiment of the present invention only requires bandwidth proportional to the percentage of the video buffer 410 used. In the preferred embodiment shown in FIG. 4, the video images 412, 414 occupy two of the four, or half of the partitions of the video buffer 410. Therefore, such a configuration would require only 0.5 MB/s of bandwidth to operate. As will be shown, the display frame 140 in the conventional method of FIG. 1 and the display frame 430 of the present invention in FIG. 4 are similar in appearance, thereby magnifying the importance of a 75% bandwidth requirement.

Still referring to FIG. 4, after the video buffer 410 is partitioned and the scaled video images 412, 414 are inserted into the partitioned video buffer 410, the video buffer 410 and the graphics frame 420 are mixed by overlaying one over the other to produce the display frame 430 as shown, resulting in a display frame having both the video images 412, 414 and the graphics frame 420, while utilizing only one video buffer 410, thus greatly reducing the memory and bandwidth resources needed to conventionally produce such a display frame.

Figure 5:
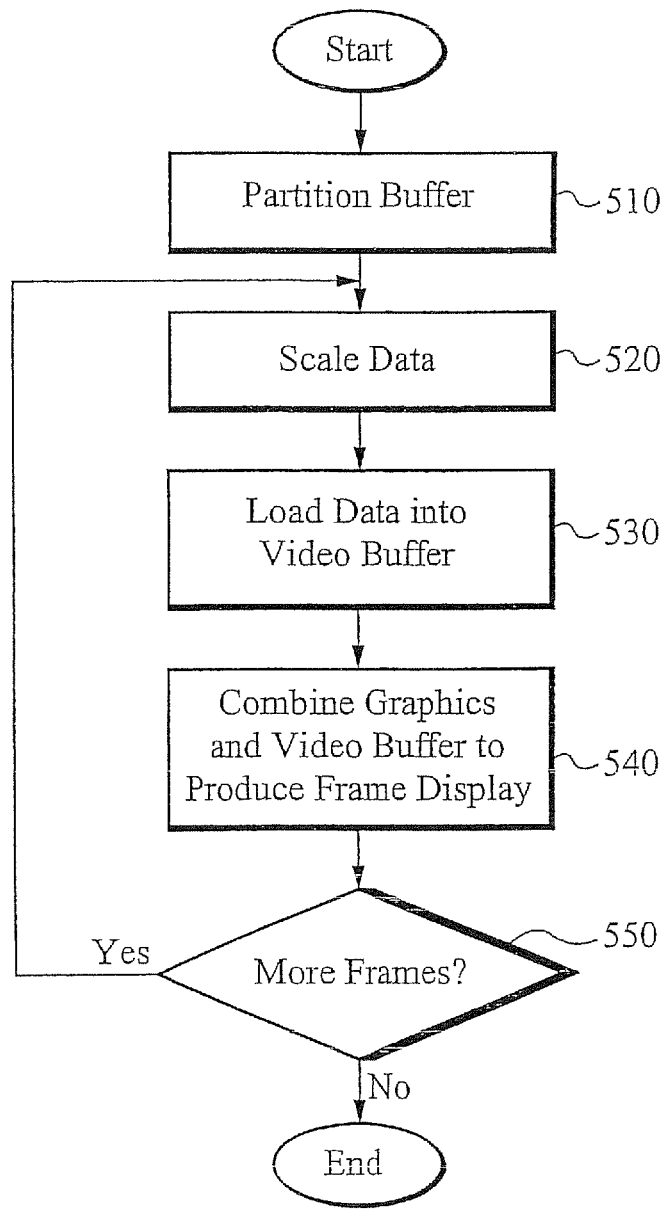
FIG. 5 illustrates a method of simultaneous display of video and graphics on a display according to the present invention.

Referring now to FIG. 5, a method generating a display frame including both a video component and a graphics component of the preferred embodiment of the present invention is depicted. The method starts when a video component and a graphics component are to be combined into a display frame. In step 510, a single video buffer representing a display area is partitioned into a plurality of sub-buffers according to any system constraints, application requirements or user needs. After the video buffer is partitioned in step 510, the data representing the video image is scaled in step 520 to the appropriate size required such that the data will fit into a corresponding partition of the video buffer. After the scaling step 520, the scaled data is loaded into the partitioned video buffer in step 530. In step 530, each piece of scaled data is loaded into a preassigned partition according to the final desired display location of that scaled data in the display frame. The scaled data in step 530 is also loaded into the partitioned buffer such that the graphics frame will not overlay the video images created by the scaled data.

Still referring to FIG. 5, after the scaled data is loaded in to the partitioned buffer in step 530, the partitioned video buffer is combined with a graphics frame to produce a display frame including both the video buffer and the graphics frame in step 540. Step 540 includes mixing the video and graphics components by overlaying one over the other. After the mixing is completed in step 540, if there are more video and graphics frames to be mixed into a display frame, step 550 of the method returns to step 520 where scaling of the next frame of data begins. The method returns to step 520 rather than to step 510 in the preferred embodiment as the single partitioned buffer remains partitioned after the initial step 510 and does not require an additional partitioning. Finally, referring back to step 550, if there are no more frames to combine, the method ends.

In operation, the set-top box of the present invention is powered on. When a user opens multiple applications or windows on a display device using the user interface of the set-top box, the central processing unit of the set-top box partitions the video buffer in the system memory in to a number of sub-buffers corresponding to each of the separate display windows currently open on the display device. The size of each sub-buffer within the system memory is preferably proportionate to the size of its corresponding display window with the display. The set-top box receives video data from a content source such as a satellite dish or cable provider, etc. The video signal enters the set-top box via an I/O interface, where the first frame of the video data is loaded into the sub-buffers of the video buffer in the system memory. Each video image in the first frame of the video data is pre-scaled by the central processing unit, to fit the video image into its corresponding sub-buffer. Each video image is assigned to a corresponding sub-buffer according to the display window for which the video image will be displayed on the display device. After all the video images of the first video frame are pre-scaled and loaded into the appropriate sub-buffers, the central processing unit will then preferably mix in any graphics frame by overlaying the graphics frame on to the video buffer and displaying this hybrid (video and graphics) display frame on the display device. If no graphics frame exists, then the video data within the video buffer will be displayed on the display device, with each sub-buffer being displayed in its appropriate display window. This process continues as long as there is video data entering the set-top box.

The set-top box of the present invention utilizes a single video buffer and a single graphics screen, which are to be mixed or overlaid to generate one single display including multiple video objects on the display at the same time with only one video buffer. The sole video buffer is partitioned into sub-buffers each corresponding to a display window. The video data to be displayed in each display window is pre-scaled and then stored in its corresponding sub-buffer. Once all the video data has been loaded into the appropriate sub-buffers, then any appropriate graphics data is overlaid and the video data is displayed. This set-top box of the present invention reduces memory and bandwidth consumption by utilizing a single video buffer, pre-scaling the video data representing each video window while still allowing multiple video images to be combined with a graphics screen.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention. Specifically, it will be apparent to one of ordinary skill in the art that while the preferred embodiment of the present invention is used with set-top boxes, the present invention can also be implemented on any other appropriate system resource limited device.

What is claimed is:

1. A device to produce a display frame by mixing a graphics frame and a video buffer, the device comprising:
   a. an input/output interface to receive a stream of video data from a source device; and
   b. a processing circuit coupled to the input/output interface, the processing circuit configured to receive the stream of video data, to partition the video buffer into a plurality of sub-buffers wherein the number of sub-buffers corresponds to the number of displayed windows, to scale the video data, to load the stream of video data in to the plurality of sub-buffers and to mix the video buffer with the graphics frame to produce the display frame, further wherein the sub-buffers are defined by an address range.

2. The device according to claim 1 further comprising a display device coupled to the device through the input/output interface for displaying the display frame.

3. The device according to claim 2 wherein the display device comprises a television.

4. The device according to claim 1 wherein the source device comprises a home server.

5. The device according to claim 1 wherein the device comprises a set-top box.

6. The device according to claim 1 wherein the device resides within a home network.

7. The device according to claim 1 wherein the video buffer is partitioned into a plurality of sub-buffers.

8. A set-top box to produce a display frame by mixing a graphics frame and a video buffer, the set-top box comprising:
   a. an input/output interface to receive a stream of video data from a source device; and
   b. a processing circuit coupled to the input/output interface, the processing circuit configured to receive the stream of video data, to partition the video buffer into a plurality of sub-buffers wherein the number of sub-buffers corresponds to the number of displayed windows, to scale the video data, to load the stream of video data in to the plurality of sub-buffers and to mix the video buffer with the graphics frame to produce the display frame, further wherein the sub-buffers are defined by an address range.

9. The set-top box according to claim 8 further comprising a display device coupled to the set-top box through the input/output interface for displaying the display frame.

10. The set-top box according to claim 9 wherein the display device comprises a television.

11. The set-top box according to claim 8 wherein the source device comprises a home server.

12. The set-top box according to claim 8 wherein the set-top box resides within a home network.

13. The set-top box according to claim 8 wherein the video buffer is partitioned into a plurality of sub-buffers.

14. A network of devices to produce a display frame by mixing a graphics frame and a video buffer, the network of devices comprising:
- a. a source device to provide a stream of video data;
- b. a set-top box including an input/output interface to receive a stream of video data from the source device and a processing circuit coupled to the input/output interface, the processing circuit configured to receive the stream of video data, to partition the video buffer into a plurality of sub-buffers wherein the number of sub-buffers corresponds to the number of displayed windows, to scale the video data, to load the stream of video data in to the plurality of sub-buffers and to mix the video buffer with the graphics frame to produce the display frame, further wherein the sub-buffers are defined by an address range; and
- c. a display device coupled to the set-top box through the input/output interface for displaying the display frame.

15. The network of devices according to claim 14 wherein the source device comprises a home server.

16. The network of devices according to claim 14 wherein the display device comprises a television.

17. The network of devices according to claim 14 wherein the video buffer is partitioned into a plurality of sub-buffers.

* * * * *